(12) United States Patent
Kondo et al.

(10) Patent No.: US 6,431,738 B1
(45) Date of Patent: Aug. 13, 2002

(54) VERSATILE POWER-EFFICIENT AUTOMOBILE SIGNAL LAMP

(75) Inventors: Toshiyuki Kondo; Hidetaka Okada, both of Tokyo (JP)

(73) Assignee: Stanley Electric Co., Ltd., Tokyo (JP)

( * ) Notice: Subject to any disclaimer, the term of this patent is extended or adjusted under 35 U.S.C. 154(b) by 0 days.

(21) Appl. No.: 09/695,892

(22) Filed: Oct. 25, 2000

(30) Foreign Application Priority Data

Jan. 21, 2000 (JP) ........................................ 2000-013239

(51) Int. Cl.$^7$ ................................................. F21V 7/00
(52) U.S. Cl. ........................ 362/517; 362/518; 362/543; 362/240; 362/241; 362/297
(58) Field of Search ................................. 362/517, 518, 362/543, 235, 240, 241, 247, 297

(56) References Cited

U.S. PATENT DOCUMENTS 6,152,589 A * 11/2000 Kawaguchi et al. ........ 362/518

* cited by examiner

Primary Examiner—Alan Cariaso
Assistant Examiner—Ronald E. DelGizzi
(74) Attorney, Agent, or Firm—Weingarten, Schurgin, Gagnebin & Lebovici LLP

(57) ABSTRACT

An automobile signal lamp having at least one light emitting unit including a light source whose main light emitting direction substantially agrees with the irradiation axis of the automobile signal lamp, a first reflecting surface corresponding to at least irradiation direction side half of a parabolic reflecting surface obtained by rotating around said irradiation axis a parabola taking said light source as focal point, and a direction orthogonal to said irradiation axis of the automobile signal lamp as central line, and a second reflecting surface separated from said irradiation axis by a convenient distance respectively in the reflection direction of said first reflecting surface, disposed radially not to interfere each other, and reflecting light from said first reflecting surface in a direction parallel to said irradiation axis.

9 Claims, 5 Drawing Sheets

VERSATILE POWER-EFFICIENT AUTOMOBILE SIGNAL LAMP

CROSS REFERENCE TO RELATED APPLICATIONS

N/A

STATEMENT REGARDING FEDERALLY SPONSORED RESEARCH OR DEVELOPMENT

N/A

BACKGROUND OF THE INVENTION

The present invention relates generally to an automobile signal lamp such as a tail lamp, a stop lamp, a turn signal lamp, or the like, and more specifically to a power-efficient automobile signal lamp having a structure that allows the lamp to be formed into novel configurations.

FIG. 12 depicts a conventional automobile signal lamp 90, in which an LED lamp is employed as a light source 91. The irradiation angle of the LED lamp is restricted to about 40–60 degrees, and a plurality of LED lamps is required to glitter the entire surface of a lens 92.

The light source 91 is disposed in a matrix on a printed circuit board 93. Further, a lens cut 92a, which imparts the light distribution characteristic of a tail lamp or the like to the light from the light source 91, is disposed on a surface of the lens 92 in registration with the light source 91 on the circuit board 93.

One drawback of the conventional automobile signal lamp 90 is that the number of light sources 91 is determined with priority given to glittering the entire surface of the lens 92 instead of providing the required brightness of a tail lamp or the like. As a result, an excessive number of light sources 91 is employed for the luminance and more electricity is consumed than necessary, thereby causing efficiency to be low.

Moreover, as described above, the lens cuts 92a are disposed on the surface of the lens 92 in registration with the respective light sources 91 mounted on the circuit board 93. However, when the light sources 91 are disposed in a matrix on the circuit board 93, their arrangement is limited to the matrix form or the like, thereby restricting the position of the lens cuts 92. Because variations in the position of the lens cuts 92 are limited, the lens 92 becomes monotone, which causes further design limitations.

BRIEF SUMMARY OF THE INVENTION

The present invention solves the aforementioned problems by providing an automobile signal lamp comprising at least one light emitting unit including a light source whose main light emitting direction is substantially the same as the irradiation axis of the automobile signal lamp, a first reflecting surface corresponding to a surface of revolution obtained by rotating around the irradiation axis a section of a parabolic line taking the light source as focal point, and a direction orthogonal to the irradiation axis of the automobile signal lamp as an axis of the parabola, and a second reflecting surface separated from the irradiation axis by a predetermined distance respectively in a direction to which the first reflecting surface reflects light from the source and reflecting light from the sources reflected from the first reflecting surface, in a direction parallel to the irradiation axis.

Other features, functions, and aspects of the invention will be evident to those of ordinary skill in the art from the Detailed Description of the Invention that follows.

BRIEF DESCRIPTION OF THE DRAWINGS

The invention will be more fully understood with reference to the following Detailed Description of the Invention in conjunction with the drawings of which.

DETAILED DESCRIPTION OF THE INVENTION

Figure 1:
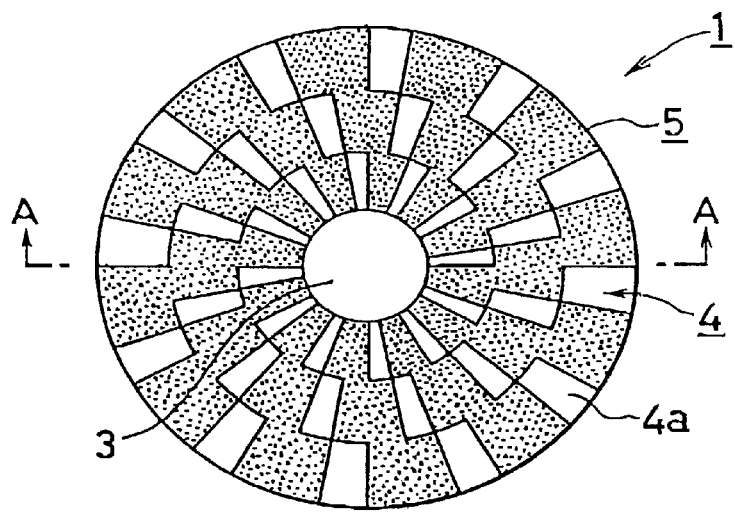
FIG. 1 is a front view of a first light emitting unit portion of an automobile signal lamp according to the present invention.

The present invention will be described in detail based on the illustrative embodiments depicted in drawings. A first embodiment of an automobile signal lamp according to the present invention is indicated by a reference numeral 1 in FIGS. 1–4. In this first embodiment, an LED lamp with a relatively narrow irradiation angle is employed as the light source 2. In contrast, as described above, the conventional automobile signal lamp has more light sources than necessary to maintain the brightness of the lamp.

In the first embodiment, the light source 2 has a main light emitting direction along an optical axis X, which is parallel to an irradiation axis Z of the automobile signal lamp 1. Further, the front of the light source 2 is covered by a first reflecting surface 3. As a result, light from the light source 2 is not irradiated directly in the irradiation direction (i.e., along the irradiation axis Z) of the automobile signal lamp 1.

Figure 2:
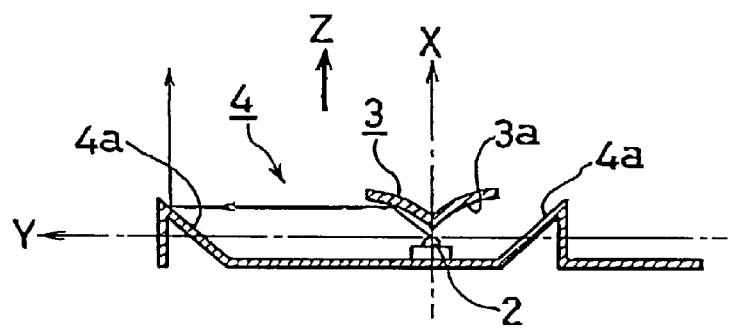
FIG. 2 is a cross section along the line A—A of FIG. 1.

A parabola, which has the light source 2 as its focal point along the optical axis X, is formed by taking a cross section of the first reflecting surface 3 (see FIG. 2). The central axis Y of the parabola is orthogonal to the optical axis X of the light source 2 and the irradiation axis Z of the automobile signal lamp 1.

Figure 5:
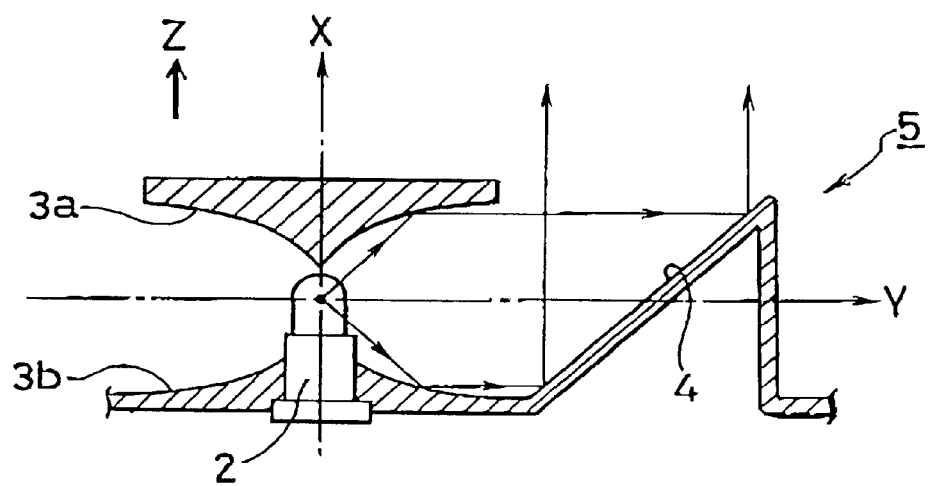
FIG. 5 is a cross section showing a portion of the light emitting unit of FIG. 1.

The parabola is rotated around the optical axis X of the light source 2 to form a parabolic reflecting surface 3a (3b; see FIG. 5). In the vicinity of the optical axis X, a portion of the reflecting surface 3a near the parabolic apex forms a closed space surrounding the periphery of the light source 2, thereby preventing light from the light source 2 from directly radiating outside the automobile signal lamp 1.

The design of the parabolic reflecting surface 3a can be modified according to the characteristics of the light source 2. For example, if the light source 2 radiates light only in a forward direction like an LED lamp, only a forward side 3a of the two parabolic reflecting surfaces 3a, 3b (see FIG. 5), which appear in forward and backward directions, respectively, relative to the irradiation direction of the automobile signal lamp 1, may be employed.

If the light source 2 radiates light with a uniform intensity approximately all around its circumference like an incandescent lamp, the parabolic reflecting surface 3a may be enough. However, if the parabolic reflecting surface 3b appearing in the backward direction relative to the irradiation direction of the automobile signal lamp 1 is also used as the first reflecting surface 3 (see FIG. 5), the light utilization factor of the light source 2 will increase and a brighter automobile signal lamp 1 will be realized.

By setting the first reflecting surface 3 as described above, light from the light source 2 is reflected by the parabolic reflecting surface 3a, which reflects the light in a direction parallel to the central axis Y of the parabola (see FIGS. 2 and 5). Because the parabolic reflecting surface 3a rotates about the optical axis X, the reflected light is generated radially around the optical axis X.

In this first embodiment, a second reflecting surface 4 (see FIG. 5) is employed in addition to the first reflecting surface 3. The second reflecting surface 4 is disposed in the optical path of the light reflected from the first reflecting surface 3 and reflects this light in a direction parallel to the irradiation axis Z of the automobile signal lamp 1. The second reflecting surface 4 may be disposed in an annular formation at equidistant positions from the optical axis X.

Figure 3:
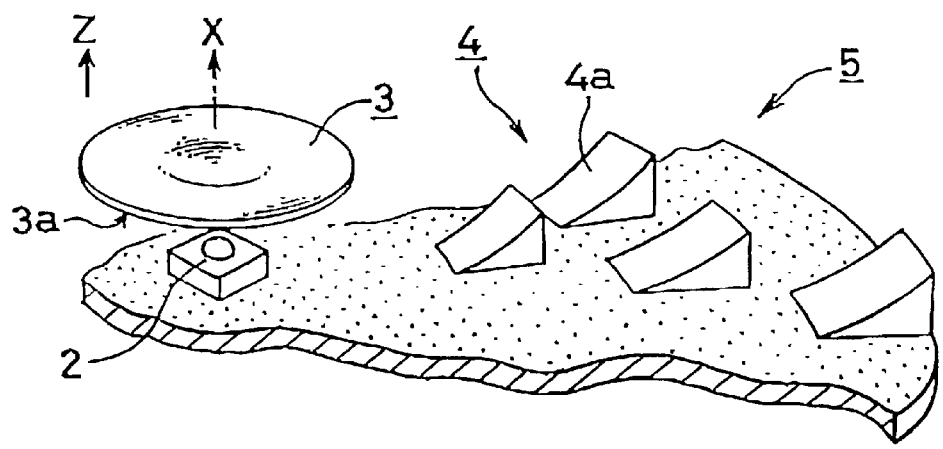
FIG. 3 is an illustrative drawing showing a composition of the light emitting unit of FIG. 1.

As shown in FIGS. 1–3, a range of 360 degrees irradiated by the light from the first reflecting surface 3 may be divided into a number of predetermined radial divisions. Further, a small reflecting surface 4a may be disposed in each radial division at a respective distance from the optical axis X, and the second reflecting surface 4a may be formed by combining these small reflecting surfaces 4a. By varying the placement of these small reflecting surfaces 4a, design variations such as a star shape can be imparted to the light emission pattern. Moreover, it is easy to diffuse the reflected light by making the reflecting surface shape of the small reflecting surface 4a convex, concave, undulated or any other suitable shape.

Figure 4:
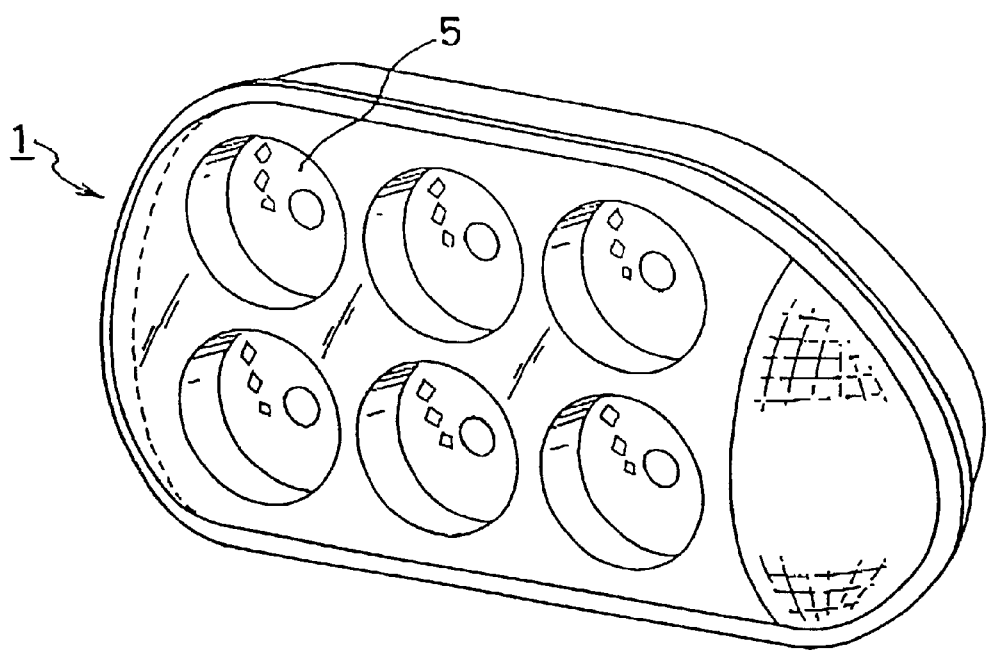
FIG. 4 is a perspective view showing an illustrative manner of using the light emitting unit of FIG. 1.

As described above, the light emitting unit 5 comprises the light source 2, the first reflecting surface 3, and the second reflecting surface 4. Further, the first embodiment of the automobile signal lamp 1 is made by assembling one or more of these light emitting units 5, as shown in FIG. 4 (the drawing shows an example in which the automobile signal lamp 1 is made by assembling six light emitting units 5).

Accordingly, if the mounting position of the light emitting unit 5 relative to the automobile signal lamp 1 is known, the reflected light from the small reflecting surface 4a can be made to satisfy the light distribution characteristics of a tail lamp or the like by imparting to the small reflecting surface 4a a reflecting shape that would diffuse the reflected light in a broad angle in the horizontal direction and diffuse the reflected light in a not so broad angle in the vertical direction.

The operation of the first embodiment of the automobile signal lamp 1 will now be described. Because the light from the light source 2 is directed in the horizontal direction relative to the optical axis X by the first reflecting surface 3 and then directed in the irradiation direction Z by the second reflecting surface 4, the light emitting area of the light emitting unit 5 is easily determined.

This allows the number of light sources 2 arranged in the automobile signal lamp 1 to be arbitrarily set. In other words, the brightness of the automobile signal lamp 1 can be optimized by optimizing the light emitting area of the light emitting unit 5, and any unnecessary brightness and power consumption due to light emission from all over the light emitting surface of the automobile signal lamp 1, as encountered in the prior art, can be prevented. In addition, because the light emitting shape of the light emitting unit 5 can be arbitrarily set by a combination of the small reflecting surfaces 4a, the light emitting surface of the automobile signal lamp 1 can be more easily designed.

Figure 6:
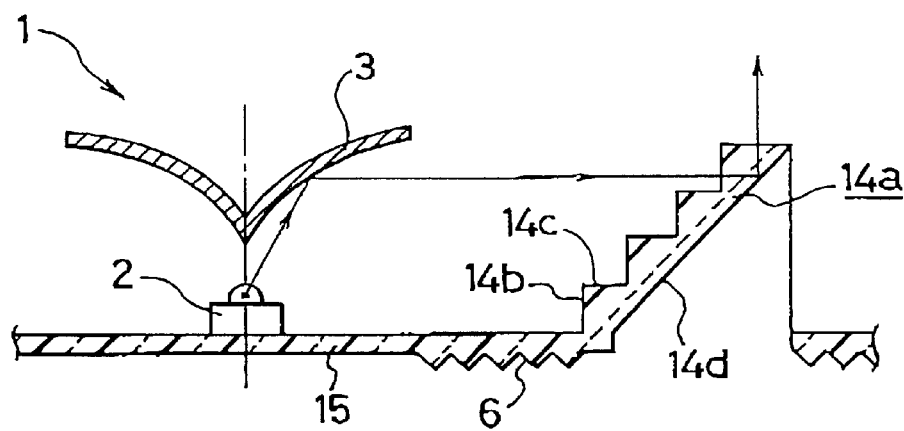
FIG. 6 is a cross section showing a second embodiment of the automobile signal lamp according to the present invention.

FIG. 6 shows a second embodiment of the automobile signal lamp 1. This second embodiment is principally concerned with the structure of the second reflecting surface. In the above-described first embodiment, the second reflecting surface 4 is formed as a mirror surface totally reflecting the light from the first reflecting surface by depositing aluminum on a substantially opaque member (or possibly a transparent member). However, the light emitting unit 15 (see FIG. 6) may be formed with a transparent member having a high refractive index such as transparent resin.

In this case, the light emitting unit 15 is formed in an approximately rectangular prism shape having an incident surface 14b directed to the light source approximately orthogonal to the light from the first reflecting surface 3, an output surface 14c approximately orthogonal to the irradiation direction, and a back surface 14d set at an angle of total internal reflection by the difference of the refractive index with respect to the atmosphere to the light incident surface 14b, at a position corresponding to the small reflecting surface 14a of the light emitting unit 15.

Here, as mentioned above for the first embodiment, the output surface 14c can be formed into a concave, convex, undulated or any other suitable shape to perform the diffusion. Further, in this second embodiment, using the fact that the light emitting unit 15 is made of a transparent resin member, a reflex reflector 6 may be formed on the total or partial area except at the position where the small reflecting surface 4a is installed.

Figure 7:
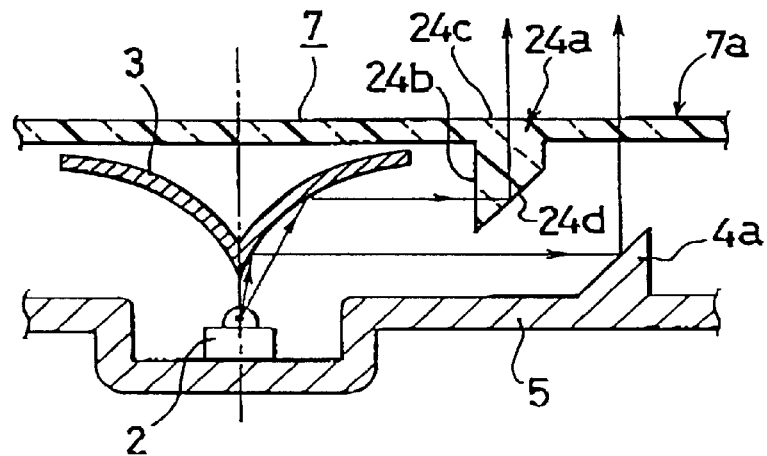
FIG. 7 is a cross section showing a third embodiment of the automobile signal lamp according to the present invention.
Figure 8:
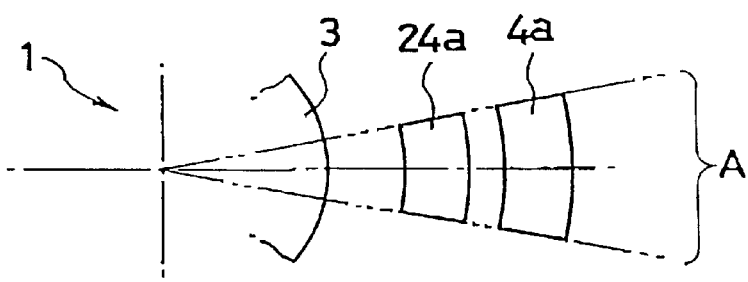
FIG. 8 is a front view of the third embodiment.

FIGS. 7–8 show a third embodiment of the automobile signal lamp 1. In the above-described second embodiment, the second reflecting surface 14 (the small reflecting surface 14a) is formed using a transparent resin member. In the third embodiment, the light emitting surface is covered by a lens 7 (see FIG. 7) made of a transparent resin member.

Accordingly, in this third embodiment, an incident surface 24b having a structure similar to that of the small reflecting surface 14a of the second embodiment, and a small reflecting surface 24a having a back surface 24d are disposed on the lens 7. However, in this case, the output surface 24c is common with the surface 7a of the lens 7. Further, this surface 7a can be formed into concave, convex, undulated or any other suitable shape. Moreover, though not shown, the reflex reflector 6 (see to FIG. 6) may be disposed at any position except for where the small reflecting surface 24a is installed.

Also, in this third embodiment, a light emitting unit 5 is provided with a small reflecting surface 4a similar to the one described for the first embodiment at the back of the lens 7 to obtain irradiation light from both of the small reflecting surfaces 4a and 24a.

In such an arrangement, light reflected from the first reflecting surface 3 near the lens 7 is reflected by the small reflecting surface 24a, and light reflected from the first reflecting surface 3 near the light emitting unit 5 is reflected by the small reflecting surface 4a. As shown in FIG. 8, the light reflected from the small reflecting surface 24a does not interfere with the light reflected from the small reflecting surface 4a. As a result, light can be emitted from adjacent regions corresponding to the small reflecting surfaces 24a and 4a within a sector A (see FIG. 8) emanating from the light source 2.

Figure 9:
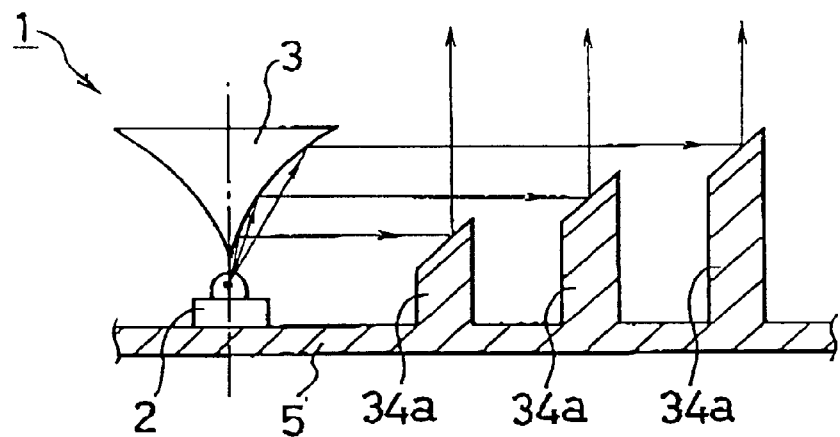
FIG. 9 is a cross section showing a fourth embodiment of the automobile signal lamp according to the present invention.
Figure 10:
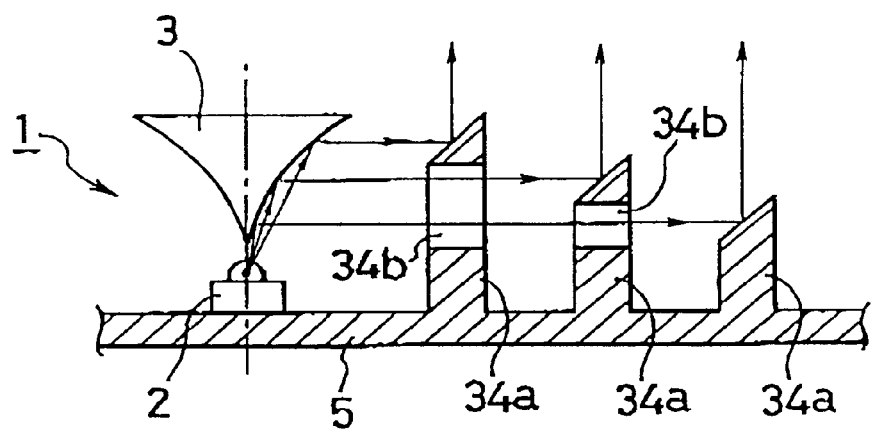
FIG. 10 is a cross section showing a variant of the fourth embodiment.

FIGS. 9–10 show a fourth embodiment, in which light emitted from adjacent regions within the above-mentioned sector A (see FIG. 8) significantly improves the appearance of the automobile signal lamp by effectively increasing the light emitting area of the light emitting unit 5.

To this end, the fourth embodiment provides a plurality of light emitting areas within the sector A (see FIG. 8). Even though the height of a small reflecting surface 34a near the first reflecting surface 3 is higher than that of small reflecting surfaces 34a farther away from the first reflecting surface 3, light can be supplied to the remote small reflecting surfaces 34a by providing tunnel-shaped openings 34b in the small reflecting surfaces 34a nearer the first reflecting surface 3, as shown in FIG. 10.

Figure 11:
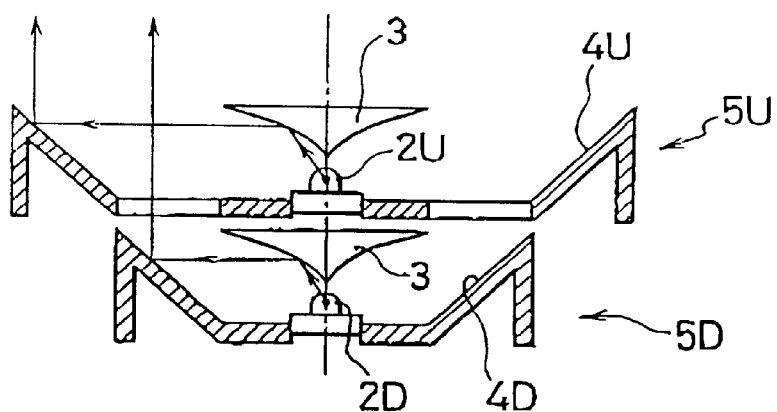
FIG. 11 is a cross section showing a fifth embodiment of the automobile signal lamp according to the present invention.
Figure 12:
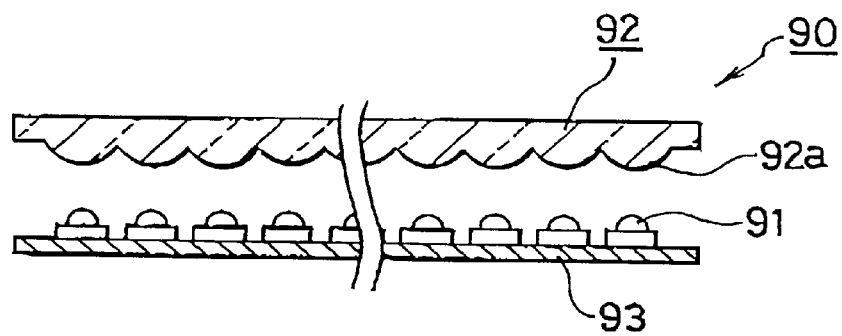
FIG. 12 is a cross section showing a conventional automobile signal lamp.

FIG. 11 shows a fifth embodiment of the automobile signal lamp 1. In the above-described fourth embodiment, if the automobile signal lamp 1 includes a plurality of light emitting units 5, the respective light emitting units are arranged so as not to be overlapped. However, the fifth embodiment does not have this limitation and can use such light emitting units in multiple overlapped rows.

In this case, if a second reflecting surface 4D of a lower light emitting unit 5D and a second reflecting surface 4U of an upper light emitting unit 5U are set in a position such that the light from the lower light emitting unit 5D is not shielded, then light from the light emitting unit 5D can be directed in the irradiation direction. It is understood that the light emitting units can be overlapped in two or more rows.

In the above description of the fifth embodiment, it is assumed that the light source 2D of the lower light emitting unit 5D and the light source 2U of the upper light emitting unit 5U are turned on at the same time. However, it is not required that the light sources 2D and 2U be turned on simultaneously. For example, for an automobile signal lamp 1 used as both a tail lamp and a stop lamp, only one row may be selectively turned on when used as a tail lamp, and a plurality of rows may be selectively turned on simultaneously when used as a stop lamp to achieve a higher level of brightness.

Also, in this fifth embodiment, for example, if a first light emitting unit 5 using a first light source 2 emitting red-colored light and a second light emitting unit 5 using a second light source 2 emitting amber-colored light are overlapped and selectively turned on and off, then the first and second light emitting units may be used in combination as a tail lamp and a turn signal lamp.

As described above, the automobile signal lamp comprising at least one light emitting unit including a light source whose main light emitting direction is substantially the same as the irradiation axis of the automobile signal lamp, a first reflecting surface corresponding to a surface of revolution obtained by rotating around the irradiation axis a section of a parabolic line taking the light source as focal point, and a direction orthogonal to the irradiation axis of the automobile signal lamp as axis of the parabola, and a second reflecting surface separated from the irradiation axis by a predetermined distance respectively in a direction to which the first reflecting surface, reflects light from the source and reflecting light from the sources reflected from the first reflecting surface, in a direction parallel to the irradiation axis, is configured to allow the light emitting area of the light emitting unit to be arbitrarily set. This can be achieved by diverging the light from the light source once in the horizontal direction relative to the optical axis by the first reflecting surface and then directing it in the irradiation direction by the second reflecting surface, thereby optimizing the number of light sources to be installed in the automobile signal lamp and reducing power consumption.

Moreover, it becomes possible to impart unique aspects to the automobile signal lamp through the arrangement of the second reflecting surface and the small reflecting surfaces or the selection of the number of overlapped rows, which leads to considerable design improvements in this kind of automobile signal lamp. In addition, the ability to change the brightness level and color of the emitting light enhances the versatility of the automobile signal lamp.

It will further be appreciated by those of ordinary skill in the art that modifications to and variations of the above-described automobile signal lamp may be made without departing from the inventive concepts disclosed herein. Accordingly, the invention should not be viewed as limited except as by the scope and spirit of the appended claims.

What is claimed is:

1. An automobile signal lamp having an irradiation axis, comprising at least one light emitting unit including a light source whose main light emitting direction is substantially the same as the irradiation axis of the automobile signal lamp, a first reflecting surface corresponding to a surface of revolution obtained by rotating around said irradiation axis a section of a parabolic line taking said light source as focal point, and a direction orthogonal to said irradiation axis of the automobile signal lamp as axis of said parabola, and a second reflecting surface separated from said irradiation axis by a predetermined distance respectively in a direction to which said first reflecting surface, reflects light from said source and reflecting light from said sources reflected from said first reflecting surface, in a direction parallel to said irradiation axis.

2. The automobile signal lamp of claim 1, wherein said second reflecting surface is formed as either a reflecting surface operating as a totally reflecting inner surface high refractivity transparent member having an outer surface in contact with the environment, or a totally reflecting surface of a mirror surface, or a combination of both reflecting surfaces.

3. The automobile signal lamp of claim 1, wherein said second reflecting surface is formed by combining standard curved surfaces, and has a dispersion function to the reflected light from said first reflecting surface.

4. The automobile signal lamp of claim 1, wherein said second reflecting surface is parabolic in shape and placed at staggered positions along said irradiation axis.

5. The automobile signal lamp of claim 1, wherein at least a portion of said light emitting unit except for where said second reflecting surface is disposed is provided with a reflex reflector in a path for light from said source.

6. The automobile signal lamp of claim 1, wherein a plurality of said light emitting units are disposed at staggered positions along said irradiation axis, and each said second reflecting surface is placed not to interfere with light reflected by other second reflecting surfaces of respective light emitting units.

7. The automobile signal lamp of claim 6, wherein one or more said light emitting units have different light source colors.

8. The automobile signal lamp of claim 2, wherein:

said second reflecting surface is formed by combining standard curved surfaces, and has a dispersion function to the reflected light from said first reflecting surface;

said second reflecting surface is parabolic in shape and placed at staggered positions along said irradiation axis;

at least a portion of said light emitting unit except for where said second reflecting surface is disposed is provided with a reflex reflector in a path for light from said source;

a plurality of said light emitting units are disposed at staggered positions long said irradiation axis, and each said second reflecting surface is placed not to interfere with light reflected by other second reflecting surfaces of respective by light emitting units.

9. The automobile signal lamp of claim 8, wherein one or more said light emitting units have different light source colors.

* * * * *

UNITED STATES PATENT AND TRADEMARK OFFICE
CERTIFICATE OF CORRECTION

PATENT NO.    : 6,431,738 B1  
DATED         : August 13, 2002  
INVENTOR(S)   : Toshiyuki Kondo et al.

It is certified that error appears in the above-identified patent and that said Letters Patent is hereby corrected as shown below:

<u>Title page,</u>  
Item [57], ABSTRACT, delete printed Abstract and insert the following new Abstract:

```
    --A versatile power-efficient automobile signal lamp.  The
automobile signal lamp includes at least one light emitting unit
having a light source whose main light emitting direction is
substantially the same as the irradiation axis of the automobile
signal lamp, a first reflecting surface corresponding to a
surface of revolution obtained by rotating around the irradiation
axis a section of a parabolic line taking the light source as
focal point, and a direction orthogonal to the irradiation axis
of the automobile signal lamp as an axis of the parabola, and a
second reflecting surface separated from the irradiation axis by
a predetermined distance respectively in a direction to which the
first reflecting surface reflects light from the source and
reflecting light from the sources reflected from the first
reflecting surface, in a direction parallel to the irradiation
axis.--
```

Signed and Sealed this

Thirtieth Day of September, 2003

JAMES E. ROGAN  
*Director of the United States Patent and Trademark Office*